US007571565B2

United States Patent
Noble et al.

(10) Patent No.: US 7,571,565 B2
(45) Date of Patent: Aug. 11, 2009

(54) CASING MATERIAL AND ITS USE IN CROP CULTIVATION

(75) Inventors: Ralph Noble, Wellesbourne (GB); Leslie Bareham, Selby (GB)

(73) Assignee: University of Warwick (GB)

( * ) Notice: Subject to any disclaimer, the term of this patent is extended or adjusted under 35 U.S.C. 154(b) by 0 days.

(21) Appl. No.: 11/734,767

(22) Filed: Apr. 12, 2007

(65) Prior Publication Data

US 2007/0209275 A1 Sep. 13, 2007

Related U.S. Application Data

(63) Continuation of application No. 10/473,095, filed as application No. PCT/GB02/01172 on Mar. 26, 2002, now abandoned.

(30) Foreign Application Priority Data

| Mar. 26, 2001 | (GB) | ................................. 0107515.9 |
| Jun. 15, 2001 | (GB) | ................................. 0114718.0 |
| Feb. 4, 2002 | (GB) | ................................. 0202545.0 |

(51) Int. Cl.
*A01G 1/14* (2006.01)
(52) U.S. Cl. ..................................... 47/1.1; 47/DIG. 10
(58) Field of Classification Search .................... 47/1.1, 47/DIG. 10; 71/5
See application file for complete search history.

(56) References Cited

U.S. PATENT DOCUMENTS

| 3,732,090 | A | * | 5/1973 | Breathitt, Jr. et al. ............ 71/37 |
| 4,079,543 | A | | 3/1978 | Stoller ........................... 47/1.1 |
| 4,170,842 | A | | 10/1979 | Stoller ........................... 47/1.1 |
| 4,333,757 | A | * | 6/1982 | Kurtzman, Jr. .................... 71/5 |
| 5,018,301 | A | * | 5/1991 | Kusakabe et al. ............... 47/1.1 |
| 5,503,647 | A | * | 4/1996 | Dahlberg et al. ............... 47/1.1 |
| 5,888,803 | A | * | 3/1999 | Starkey ..................... 435/254.1 |
| 6,073,388 | A | * | 6/2000 | Kananen et al. ............... 47/1.1 |
| 6,126,705 | A | | 10/2000 | Lees et al. ..................... 44/607 |
| 6,205,703 | B1 | | 3/2001 | Rettig et al. ................... 47/1.1 |
| 6,254,654 | B1 | * | 7/2001 | Van Barneveld ................. 71/8 |

FOREIGN PATENT DOCUMENTS

| CN | 1052766 | * | 7/1991 |
| EP | 0460811 A1 | * | 12/1991 |
| JP | 01080227 | * | 3/1989 |
| JP | 11-299347 | * | 11/1999 |
| WO | WO 93/13647 | * | 7/1993 |
| WO | WO 96/33602 | * | 10/1996 |
| WO | WO 98/11771 | | 3/1998 |

* cited by examiner

*Primary Examiner*—Andrea M Valenti
(74) *Attorney, Agent, or Firm*—Fish & Richardson P.C.

(57) ABSTRACT

The use of dewatered small particle tailings material derived from the industrial washing of coal, metal ores, rocks and extracted minerals as a component of casing material for the cultivation of mushrooms (*Agaricus bisporus* and other *Agaricus* spp.) is described.

14 Claims, No Drawings

CASING MATERIAL AND ITS USE IN CROP CULTIVATION

RELATED APPLICATION INFORMATION

This application is a continuation of U.S. application Ser. No. 10/473,095, filed Feb. 11, 2004, now abandoned which is a 371 of PCT/GB02/01172, filed Mar. 26, 2002, which claims priority to GB 0107515.9, filed Mar. 26, 2001; GB 0114718.0, filed Jun. 15, 2001; and GB 0202545.0, filed Feb. 4, 2002, all of which are herein incorporated by reference.

The present invention relates to a novel casing material. It further relates to the use of the casing material in the cultivation of crops, especially in the cultivation of mushrooms (particularly although not exclusively Agaricus mushrooms).

BACKGROUND OF THE INVENTION

Mushrooms, especially Agaricus bisporus and other Agaricus spp., are cultivated using compost (substrate) and a casing material which covers the compost. The casing material is used as a water absorbent layer, and is normally a peat/lime mixture.

In the UK and Ireland, about 0.5 million cubic meters of casing material are used annually. The other main mushroom producing countries in western Europe are Holland and France, both of which import peat and use an estimated 2 million cubic meters of casing materials. Globally, in excess of 15 million cubic meters of casing materials are used.

The amount of peat used in mushroom cultivation and other applications has given rise to considerable environmental concern. There has therefore been a considerable amount of research into the use of different materials for mushroom casing, including an extensive amount of work examining peat alternatives.

For example, WO 98/11771 and U.S. Pat. No. 6,205,703 disclose casing material for stacks and sitting-out areas in mushroom culture comprising 50-80 vol. % filter cake derived from wastes from paper manufacture, and 20-50 vol. % aggregates selected from peat, vegetable fibres, ground limestone, marl and molasses. JP-A-11/299347 discloses a culture substrate (i.e. compost substitute) for mushroom species that do not require a casing layer, based on powder derived from blast-furnace slag and/or steelmaking slag.

CN-A-1052766 discloses a material for covering mushrooms which includes, among other ingredients, coal industry wastes. These coal wastes may be cinder wastes produced from burning coal, or coal slag (ie a mixture of coal, soil and stones unsuitable for burning). The particle size of the wastes is not disclosed.

The alternative materials used in the prior art have generally given inferior mushroom yield results compared to peat-based casing. It is therefore an object of the present invention to provide a casing material capable of providing a partial or complete alternative to peat, while producing a mushroom yield at least equivalent to peat-based casing.

SUMMARY OF INVENTION

The invention provides a casing material containing small particle tailings, the use of such a casing material in crop (especially mushroom) cultivation, methods of cultivating crops (especially mushrooms) using the tailings, and crops (especially mushrooms) when produced by the method.

Small particle tailings are by-products derived from the industrial washing of coal, metal ores, rocks and other extracted minerals to produced a suspension of small particles, followed by dewatering of the suspension of small particles. The tailings material, which is obtained from the mining and quarrying/mineral extraction industries, comprises coal and/or rock and other components.

The use of small particle tailings in casing material according to the present invention provides a number of advantages, for example:
reduced peat consumption for mushroom casing by substitution with a waste by-product (environmental benefits)
a peat alternative in countries where good quality peat is unavailable (USA, Australia)
higher dry matter content compared to standard peat/lime casing material
mushroom yield at least equivalent to, and frequently higher than, obtained using standard peat/lime casing material
denser casing material (which is generally preferred by farms applying casing with machinery on shelves)
a reduced requirement for lime or calcaerous additive (chalk or sugar beet lime) compared with peat/lime casing materials

PREFERRED EMBODIMENTS

It is preferred that the small particle tailings are coal tailings, ie those derived from the coal mining industry. Such tailings contain carbon which is known to stimulate the initiation of mushrooms.

A preferred small particle tailings material is multi-roll filter cake, MRF. MRF comprises a black, fine-particle sludge of coal and rock which is obtained from coal washing plants and consists of a suspension has been dewatered. Currently the material is disposed of on to heaps; this involves a transport and handling cost. Suitable substitutes for MRF include small particle tailings from washing plants for other mining industries (eg metal ores) and rock/mineral extraction/quarrying industries (eg granite).

The small particle tailings are usually dewatered using one or more of the following processes: mechanically in presses, by the addition of dewatering polymers (eg polyacrylamides at about 2 ppm) or during storage in lagoons (sedimentation). When dewatering is carried out using a polyacrylamide, this may be a non-ionic polyacrylamide (for example Alcosorb® ABI available from Ciba Specialty Chemicals) in combination with an anionic polyacrylamide (for example Magnafloc® 1011 available from Ciba Specialty Chemicals).

Suitable tailings have a small particle size. By 'small particle tailings' in the present specification is meant tailings particles of sufficiently small size such that, in use, casing material including the small particle tailings has sufficient volumetric water holding capacity to enable crops, in particular mushrooms, to grow in a yield substantially equivalent or superior to that obtained using a peat-based casing.

Preferred tailings are of particle size such that, when the tailings are incorporated into a casing material, the casing material so produced has a volumetric water holding capacity of 60-80% v/v, more preferably 63-72% v/v, still more preferably 65-70% v/v, and especially 67-68% v/v (the volumetric water holding capacity is measured according to British Standard 4156 and is assessed as a percentage of the total volume of the casing material).

Suitable tailings may be of particle size such that they predominantly pass a 63 μm (BS 1377) sieve (ie more than about 50% of the particles pass such a sieve).

Typically, at least 55% w/w of the tailings passes a 63 μm sieve, 35% w/w passes a 6 μm sieve, and 20% W/W passes a 2 μm sieve, the sieve sizes being those used in BS 1377, Part 2, 1990, Clause 9.5. In a preferred embodiment, the tailings material is of particle size such that at least 95% w/w passes a 3.35 mm sieve, at least 90% w/w passes a 2 mm sieve, at least 85% w/w passes a 1.18 mm sieve, at least 80% w/w passes a 600 μm sieve, at least 75% w/w passes a 425 μm sieve, at least 70% w/w passes a 330 μm sieve, at least 65% w/w passes a 150 μm sieve, and at least 55% w/w passes a 63 μm sieve, the sieves being those used in British Standard 1377, Part 2: 1990, Clause 9.2. The above particle size measurements exclude mixing or adulteration with other materials before measurement.

The new casing material of this invention can be made by mixing MRF or other small particle tailings with a conventional casing material, at a level preferably less than the volume of the conventional casing material. We envisage from 1 to 50% by volume of MRF or other tailings, more typically 10% to 40%, say about 25%.

The average bulk density of the casing material of the present invention is typically 670-880 g/L, preferably 720-830 g/L, and more preferably 740-800 g/L.

The casing material according to the present invention has sufficient volumetric water holding capacity to enable crops, in particular mushrooms, to grow in a yield substantially equivalent or superior to that obtained using a peat-based casing. The average volumetric water holding capacity of the casing material of the present invention is preferably 60-80% v/v, more preferably 63-72% v/v, still more preferably 65-70% v/v, and especially 67-68% v/v (the volumetric water holding capacity is measured according to British Standard 4156 and is assessed as a percentage of the total volume of the casing material).

Alternatively, we envisage formulation of the new casing material by admixing of MRF or other small particle tailings with a water absorbent material selected from peat, composted bark, coconut fibre, paper waste or other material suited for a casing material. Further components can be added, such as the lime or other calcaerous additives currently employed in casing materials. The amount of calcaerous additive, for example lime, is typically an amount of 0 to 20%, preferably 5 to 15%, by volume, based on the total amount of the finished casing material. Since the tailings usually have a higher pH (about 7.4 for MRF) than that of peat (typically 3.1 to 5.5), less lime or calcaerous additive is needed with 25% MRF or tailings casing materials than with peat/lime casing materials to achieve a desired pH (normally about 7.5).

The casing material according to the present invention is suitable for use in many agricultural and horticultural fields, in order to cultivate a wide range of crops, including foodstuffs, for example edible fungi such as mushrooms (particularly *Agaricus* mushrooms), plants suitable for human or animal consumption, for example tubers and other root crops such as potatoes and carrots, leafy vegetables such as spinach and lettuce, fruit such as apples, strawberries and pears, and ornamental plants, for example flowers such as daffodils, roses and tulips, and trees and shrubs such as pine, oak, holly and hawthorn.

Crops which are conventionally cultivated using compost and/or a casing material are particularly suitable for cultivation using the casing material of the present invention. The casing material of the present invention is especially suitable for the cultivation of mushrooms.

In addition, the casing material of the present invention is particularly suitable for use as a component of a blocking compost. In this cultivation method, generally known in the art, each seedling is planted in a small block of compost including the casing material of the present invention. This method of cultivation is especially suitable for the cultivation of lettuces.

The casing material including small particle tailings is possibly suited for the mechanised shelf system of production widely used in the UK and Netherlands.

The invention provides in a further aspect crops, especially foodstuffs such as mushrooms, produced using the casing material and method of the invention. In the case of foodstuffs, the invention encompasses both the raw product and the product when treated in any way subsequent to cultivation, for example when the product has undergone any of the following processes:

Washing and cleaning

Treatment with additives (examples of which include colourings, flavourings and preservatives)

Packaging (for example loose open packaging in dispensing trays such as those usually used in supermarkets to store and display fresh produce, or pre-packed in closed containers).

Cooking (for example by boiling, steaming, frying, grilling)

Particle size reduction (for example, by cutting or by liquidising in a conventional foodmixer).

EXAMPLES

We have used MRF at an inclusion rate of 25% by volume in a standard peat/lime casing material (90% peat, 10% lime), and compared the mushroom yield with that from the same standard casing material without MRF. Materials for the experiments were supplied by RJB Mining plc, Selby, Yorks (MRF), Tunnel-Tech Ltd, Leckford, Hants. and Prunty Peat Ltd, Fivemiletown, N. Ireland. The MRF used in these experiments had a particle size distribution set out in Tables 1 and 2 below and had been dewatered using a non-ionic polyacrylamide in combination with an anionic polyacrylamide (Alcosorb® AB 1 and Magnafloc® 1011, both available from Ciba Specialty Chemicals).

The first experiment took place in winter, the second in spring and the third in summer. In all the experiments, 3 flushes of mushrooms were picked from trays containing 50 kg spawned compost. The mushroom yields from the three experiments are as follows:

Experiment 1

| | |
|---|---|
| Control: Peat + Lime (Tunnel-Tech casing) | 323.5 kg mushrooms/tonne compost, mean of 4 trays |
| 25% MRF by volume in the above casing | 329.4 kg mushrooms/tonne compost, mean of 2 trays |

Experiment 2

| | |
|---|---|
| Control A: Peat + Lime (Tunnel-Tech casing) | 227.1 kg mushrooms/tonne compost, mean of 8 trays |
| 25% MRF by volume in Control A casing | 243.6 kg mushrooms/tonne compost, mean of 5 trays |
| Control B: Peat + Lime (Prunty Peat casing) | 225.5 kg mushrooms/tonne compost, mean of 8 trays |
| 25% MRF by volume in Control B casing | 240.4 kg mushrooms/tonne compost, mean of 5 trays |

Experiment 3

| | |
|---|---|
| Control A: Peat + Lime (Tunnel-Tech casing) | 276.8 kg mushrooms/tonne compost, mean of 6 trays |
| 25% MRF by volume in | 275.7 kg mushrooms/tonne compost, |

-continued

| | |
|---|---|
| Control A casing | mean of 6 trays |
| Control B: Peat + Lime (Prunty Peat casing) | 283.2 kg mushrooms/tonne compost, mean of 6 trays |
| 25% MRF by volume in Control B casing | 284.0 kg mushrooms/tonne compost, mean of 6 trays |

The above results demonstrate that the casing material used in the present invention is capable of providing a mushroom yield at least equivalent to, and frequently exceeding, a standard peat/lime casing, while reducing the amount of peat required and thereby conserving this valuable natural resource.

No effects on mushroom cleanness were observed in any of the experiments.

Mushroom dry matter content was slightly higher from the 25% MRF casing materials (7.8% compared with 7.69%).

The addition of the 25% MRF reduced the volumetric water holding capacity of the casing material slightly (on average from 70.4% v/v to 67.7% v/v, as a percentage of the total volume of the casing material) but the bulk density of the material was increased (from 618-643 g/L to 745-799 g/L).

Freeze-dried mushrooms from the first and second flushes from Experiments 2 and 3 were analysed for heavy metals (As, Cd, Cr, Cu, Hg, Ni, Pb, Se, Zn), toluene, 16 different polynuclear aromatic hydrocarbons (PAHs), total PAHs, 4 different phenols and total phenols. The levels of these elements or compounds in mushrooms from the four treatments (Casings A and B, with and without 25% MRF) were not significantly different. No polyacrylamide was detected in the washing from any of the mushrooms.

Particle Size Distribution of Suitable Dewatered Tailings

TABLE 1

Determination of particle size distribution (wet sieve method) British Standard 1377: Part 2: 1990 Clause 9.2

| BS Sieve Size | Passing BS Sieve Size, minimum, % w/w |
|---|---|
| 3.35 mm | 95 |
| 2 mm | 90 |
| 1.18 mm | 85 |
| 600 μm | 80 |
| 425 μm | 75 |
| 300 μm | 70 |
| 150 μm | 65 |
| 63 μm | 55 |

TABLE 2

Determination of particle size distribution (hydrometer method) British Standard 1377: Part 2: 1990 Clause 9.5

| BS Sieve Size | Passing BS Sieve Size, minimum, % w/w |
|---|---|
| 20 μm | 45 |
| 6 μm | 35 |
| 2 μm | 20 |

The invention claimed is:

1. A casing material for cultivating mushrooms, the casing material consisting of peat, lime, and small particle tailings material, wherein at least a portion of the tailings material is coal tailings, wherein the small particle tailings material constitutes up to 50% and the lime constitutes up to 20% of the total volume of the casing material, and wherein more than about 50% of the small particle tailings material passes a 63 μm sieve.

2. The casing material of claim 1, wherein the small particle tailings material is a mixture of tailings, further comprising rock tailings, metal tailings, or both.

3. The casing material of claim 2, wherein the small particle tailings material is of particle size such that the casing material has a volumetric water holding capacity of 60 to 80% v/v as a percentage of the total volume of the casing material.

4. The casing material of claim 1, wherein the small particle tailings material is multi-roll filter cake (MRF).

5. The casing material of claim 4, wherein the small particle tailings material is of particle size such that the casing material has a volumetric water holding capacity of 60 to 80% v/v as a percentage of the total volume of the casing material.

6. The casing material of claim 1, wherein the small particle tailings material is of particle size such that the casing material has a volumetric water holding capacity of 60 to 80% v/v as a percentage of the total volume of the casing material.

7. The casing material of claim 6, wherein the small particle tailings material predominantly passes a 63 μm sieve.

8. The casing material of claim 7, wherein the small particle tailings material is of particle size such that at least 55% w/w passes a 63 μm sieve, at least 35% w/w passes a 6 μm sieve, and at least 20% w/w passes a 2 μm sieve.

9. The casing material of claim 7, wherein the small particle tailings material is of particle size such that at least 95% w/w passes a 3.35 mm sieve, at least 90% w/w passes a 2 mm sieve, at least 85% w/w passes a 1.18 mm sieve, at least 80% w/w passes a 600 μm, at least 75% w/w passes a 425 μm sieve, at least 70% w/w passes a 330 μm sieve, at least 65% w/w passes a 150 μm sieve, and at least 55% w/w passes a 63 μm sieve.

10. The casing material of claim 1, wherein the small particle tailings material constitutes 10 to 40% of the total volume of the casing material.

11. The casing material of claim 1, wherein the lime constitutes 5-15% of the total volume of the casing material.

12. A system for the cultivation of mushrooms, comprising compost and the casing material of claim 1.

13. A method of cultivating a mushroom, the method comprising cultivating the mushroom using the casing material of claim 1.

14. The method of claim 13, wherein the mushroom is of species *Agaricus bisporus* or other *Agaricus* spp.

* * * * *